United States Patent [19]

Ogawa et al.

[11] Patent Number: 5,513,721
[45] Date of Patent: May 7, 1996

[54] COVER STRUCTURE AND BATTERY STORING CASE STRUCTURE FOR AN ELECTRIC VEHICLE

[75] Inventors: Masao Ogawa; Hiroyuki Sako; Hiroyuki Shimmura, all of Saitama, Japan

[73] Assignee: Honda Giken Kogyo Kabushiki Kaisha, Tokyo, Japan

[21] Appl. No.: 325,877

[22] Filed: Oct. 19, 1994

[30] Foreign Application Priority Data

Oct. 19, 1993 [JP] Japan .................. 5-261337

[51] Int. Cl.⁶ .................................................. B62K 19/40
[52] U.S. Cl. ............................................. 180/220; 180/68.5
[58] Field of Search ............................. 180/220, 225, 180/68.1, 68.2, 68.3, 68.5, 65.1, 69.2, 69.25

[56] References Cited

U.S. PATENT DOCUMENTS

| | | | |
|---|---|---|---|
| 2,104,773 | 1/1938 | Saunders | 180/68.5 |
| 2,717,045 | 9/1955 | Nallinger | 180/68.5 X |
| 3,003,573 | 10/1961 | Lorenz | 180/68.5 |
| 3,163,251 | 12/1964 | Rees | 180/309 |
| 3,713,502 | 1/1973 | Delaney et al. | 180/217 X |
| 3,745,048 | 7/1973 | Dinkler et al. | 429/120 |
| 3,773,131 | 11/1973 | Jaulmes | 180/220 X |
| 3,928,080 | 12/1975 | Aronson | 429/81 |
| 4,058,182 | 11/1977 | Huber | 180/68.5 |
| 4,111,274 | 9/1978 | King et al. | 180/216 X |
| 4,135,593 | 1/1979 | Fowkes | 180/68.5 X |
| 4,183,418 | 1/1980 | Dudas | 180/216 |
| 4,216,839 | 8/1980 | Gould et al. | 180/68.5 X |
| 4,267,895 | 5/1981 | Eggert, Jr. | 180/68.5 X |
| 4,406,342 | 9/1983 | Lacroix | 180/68.5 |
| 4,468,440 | 8/1984 | Evjen | 429/120 X |
| 4,522,898 | 6/1985 | Esrom | 429/120 |
| 4,666,009 | 5/1987 | Yashima et al. | 180/68.5 |
| 4,897,322 | 1/1990 | Jessen | 429/62 |
| 5,015,545 | 5/1991 | Brooks | 180/68.5 |
| 5,082,075 | 1/1992 | Karolek et al. | 180/68.5 X |
| 5,101,924 | 4/1992 | Yamagiwa et al. | 180/220 |
| 5,207,288 | 5/1933 | Ono | 180/65.5 X |
| 5,222,572 | 6/1993 | Yamagiwa et al. | 180/220 |
| 5,392,873 | 2/1995 | Masuyama et al. | 180/68.5 |
| 5,421,427 | 6/1995 | Ogawa et al. | 180/220 |

FOREIGN PATENT DOCUMENTS

| | | |
|---|---|---|
| 327023 | 1/1976 | Austria . |
| 0003888 | 2/1979 | European Pat. Off. . |
| 0050057 | 9/1981 | European Pat. Off. . |
| 0408074 | 1/1991 | European Pat. Off. . |
| 0469995 | 5/1992 | European Pat. Off. . |
| 0539269 | 4/1993 | European Pat. Off. . |
| 639011 | 6/1928 | France . |
| 2168886 | 1/1972 | France . |
| 2180709 | 3/1973 | France . |
| 2486311 | 7/1981 | France . |
| 2669585 | 10/1991 | France . |
| 515051 | 7/1929 | Germany . |
| 801371 | 6/1949 | Germany . |
| 2543308 | 3/1977 | Germany ............. 180/68.5 |
| 3110365 | 10/1982 | Germany . |
| 4018347 | 6/1990 | Germany . |
| 2182590 | 7/1990 | Japan .................. 180/220 |
| 3-105098 | 4/1991 | Japan . |
| 3128789 | 5/1991 | Japan . |
| 3-243484 | 10/1991 | Japan . |
| 4-257784 | 9/1992 | Japan .................. 180/68.5 |
| 5105147 | 4/1993 | Japan .................. 180/220 |
| 5105143 | 4/1993 | Japan .................. 180/220 |
| 5-122270 | 5/1993 | Japan . |
| 1298046 | 11/1972 | United Kingdom . |
| 2027978 | 9/1979 | United Kingdom . |
| WO8400642 | 2/1984 | WIPO . |

OTHER PUBLICATIONS

Patent Abstracts of Japan, vol. 16, No. 34 (M-1204) (5077) Jan. 28, 1992 & JP-A-03 243 484 (Honda) Oct. 30, 1991, abstract.

*Primary Examiner*—Kevin T. Hurley
*Attorney, Agent, or Firm*—Birch, Stewart, Kolasch & Birch

[57] ABSTRACT

A cover structure to improve a waterproof performance of a front surface of a battery storing case in an electric vehicle wherein subcovers are provided between a front fender covering a front wheel and a front surface of a battery storing case. In addition, a gap formed between the subcovers and the fender or the front surface of the battery storing case is formed like a maze so as to stop an upward flow of muddy water.

8 Claims, 14 Drawing Sheets

5,513,721

COVER STRUCTURE AND BATTERY STORING CASE STRUCTURE FOR AN ELECTRIC VEHICLE

BACKGROUND OF THE INVENTION

1. Field of the Invention

The present invention relates to an improvement in waterproof and drain performances of a cover and a battery storing case in an electric vehicle.

2. Background of Related Art

The present applicant has already proposed a battery supporting device for an electric vehicle in Japanese Patent Laid-open No. 5-112270, in which there is shown a motorcycle having a plurality of batteries arranged under a step floor. The batteries are stored in a battery case.

SUMMARY AND OBJECTS OF THE INVENTION

It is a principle of the present invention to include the battery case which is located just behind a front wheel, so that muddy water splashed by the front wheel directly strikes against the battery case. Accordingly, the battery case is required to have a strict sealing structure.

It is therefore an object of the present invention to provide a relatively simple cover structure which is waterproof and to also provide a cover structure and a battery storing case which can easily drain in the event that water may enter the battery storing case.

It is another object of the present invention to provide a cover structure for an electric vehicle wherein a subcover is provided between a fender covering the wheel and a front surface of the battery storing case. In addition, a gap between the subcover and the fender or the front surface of the battery storing case is formed like a maze so as to stop an upward flow of muddy water.

Further, there is provided a battery storing case for an electric vehicle wherein right and left ends of a bottom plate on which a battery is placed are in close contact with battery case side covers, a rear end of the bottom plate is in close contact with a vehicular frame, and a front end of the bottom plate is separate from the vehicular frame to define a space therebetween. The space comprising a first passage having one end exposed into the battery storing case and a second passage having one end connected to another end of the first passage and another end directed rearward of the vehicle and opening to an outside of the battery storing case.

Preferably, the bottom plate comprises a corrugated plate, and the second passage is formed between a crest and a trough of the corrugated plate.

The subcover functions to receive muddy water splashed by the wheel, thereby preventing the water from entering the battery storing case. Further, the gap relating to the subcover is formed like a maze to thereby stop an upward flow of the splashed muddy water.

Water present in the battery storing case is discharged through the first passage and the second passage to the outside of the battery storing case.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A preferred embodiment of the present invention will now be described with reference to the accompanying drawings.

Figure 1:
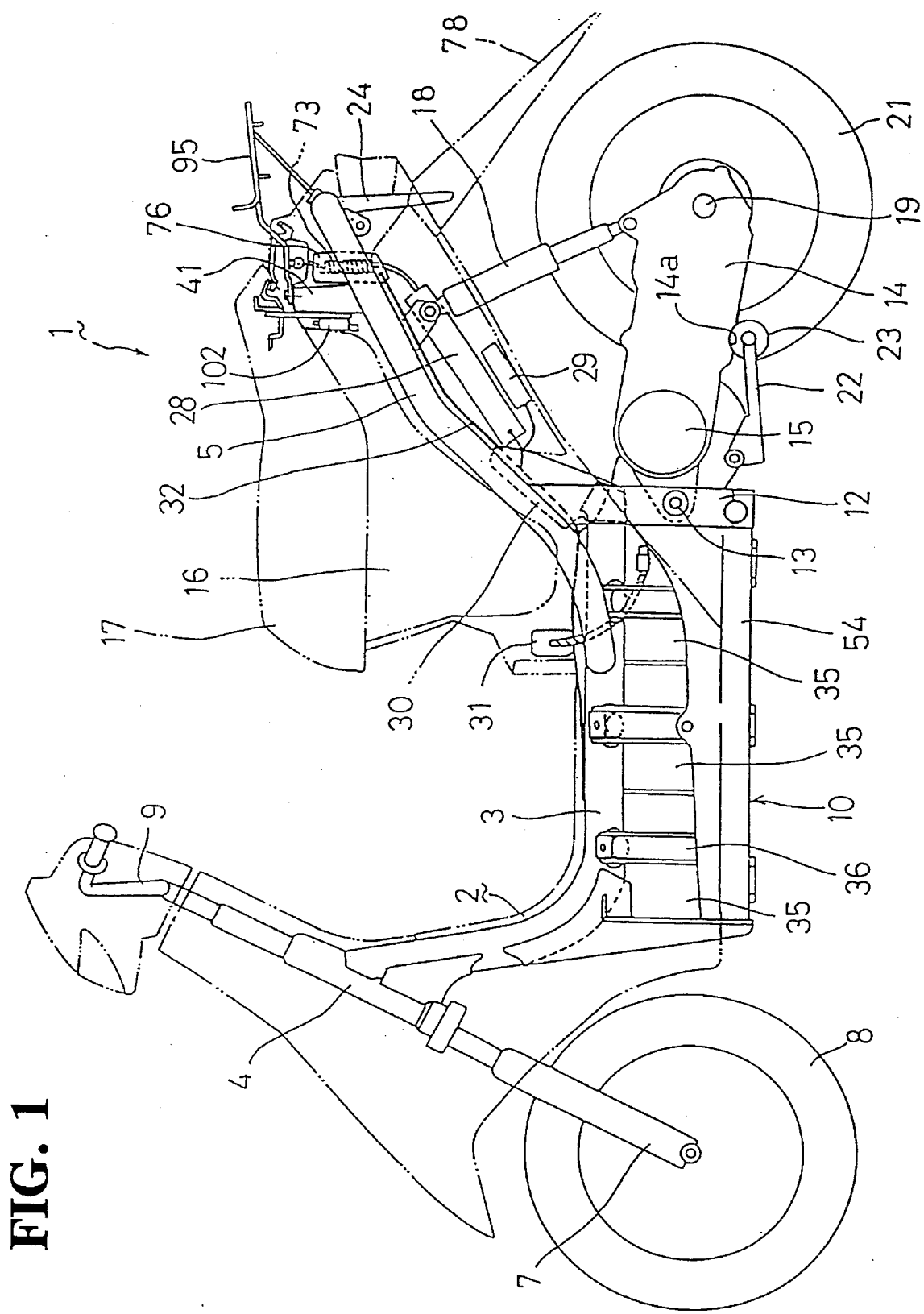
FIG. 1 is a side view of an electric vehicle according to the present invention.

FIG. 1 is a side view of an electric motorcycle according to the present invention. A vehicular frame 2 of the electric vehicle 1 comprises a main frame 3, a head pipe 4 provided before the main frame 3, and a rear frame 5 provided behind the main frame 3. A front wheel 8 is mounted through a front fork 7 to the head pipe 4. A steering handle 9 is provided at an upper portion of the head pipe 4. A battery storing case 10 is suspended from the main frame 3. A power swing unit 14 (including a traveling motor 15) is pivotally connected at a front end thereof through right and left brackets 12 and a pivot shaft 13 to a rear portion of the main frame 3. A helmet storing portion 16 and a seat 17 are mounted on the upper side of the rear frame 5 inclined upwardly toward the rear end of the vehicle and a rear suspension 18 is mounted on the lower side of the rear frame 5. A rear-portion of the power swing unit 14 is supported by a lower end of the rear suspension 18. A rear wheel 21 is mounted through an axle 19 to the rear portion of the power swing unit 14.

Electric parts such as a charger are arranged along the rear frame 5, and the vehicular frame 2 is generally covered with a cowl and a fender. This construction will be hereinafter described in detail with reference to the different drawings. Further, while a combined seat lock mechanism and plug lid lock mechanism is provided behind the seat 17, this construction will also be hereinafter described in detail.

FIG. 1 illustrates a side stand 22; a roller 23; a recess 14a for receiving the roller 23; and a license plate mounting plate 24.

Figure 2:
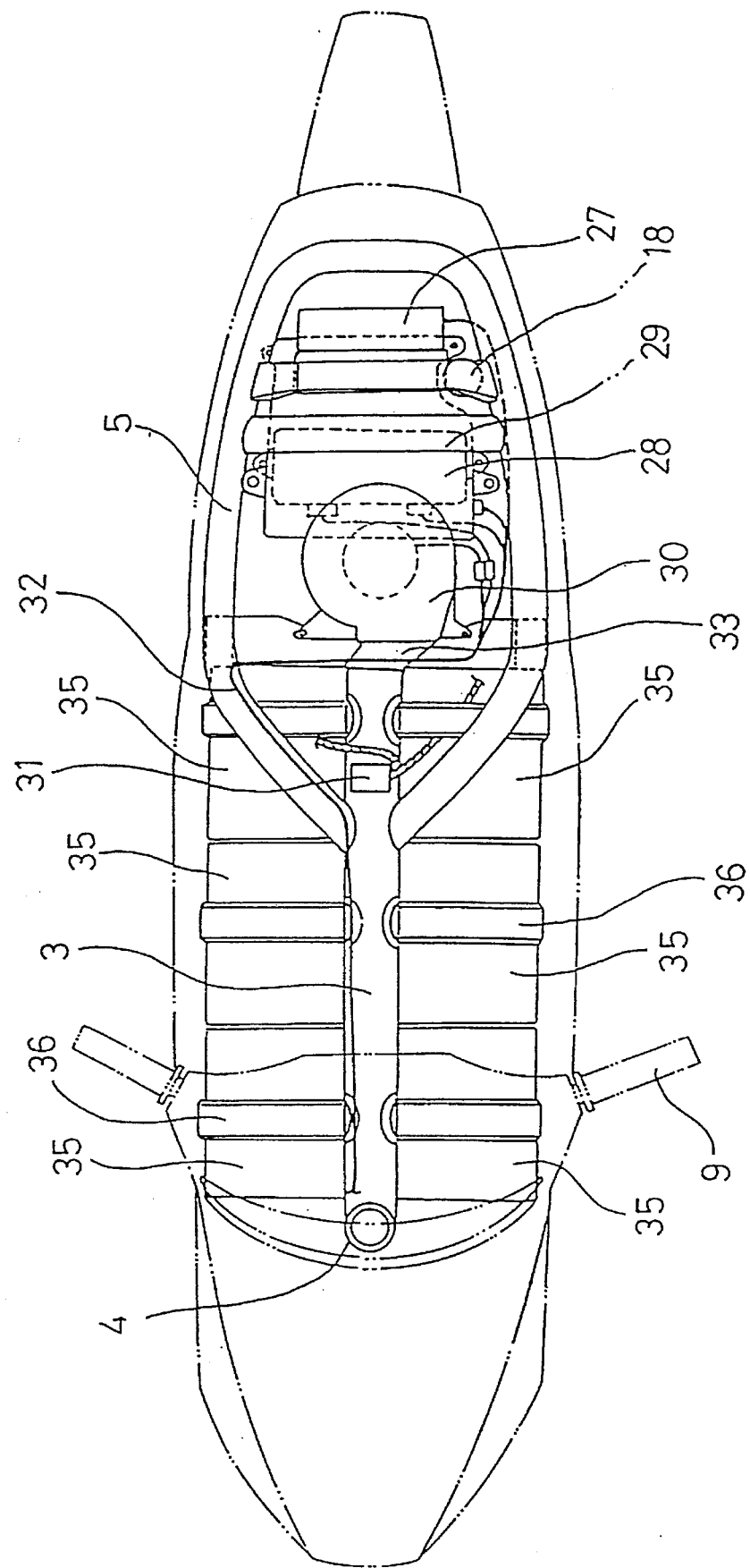
FIG. 2 is a plan view of the vehicle with a vehicular frame primarily illustrated according to the present invention.

FIG. 2 is a plan view of the vehicle according to the present invention in which the vehicular frame is primarily shown. As shown in FIG. 2, the rear frame 5 is substantially oval-shaped in plan. Inside the rear frame 5 there are arranged a down regulator 27, controllers 28 and 29 (the controller 28 is a charge controller for performing control in charging batteries and the controller 29 is a travel controller for performing control of a motor or the like in relation to traveling of the vehicle), a battery cooling fan 30, and a fuse box 31 in this order from the rear toward the front of the vehicle. A harness 32 is provided for connecting electric components.

The main frame 3 is a hollow pipe, which also serves as an air duct connected at one end thereof to a discharge duct 33 of the battery cooling fan 30. The structure of the main frame 3 also serving as the air duct will be hereinafter described.

In this preferred embodiment, six batteries 35 are mounted to the main frame 3 and are arranged in right and left, two rows each consisting of three batteries and extending in a longitudinal direction of the vehicle. A battery fixing band 36 is provided for securing each battery 35.

Figure 3:
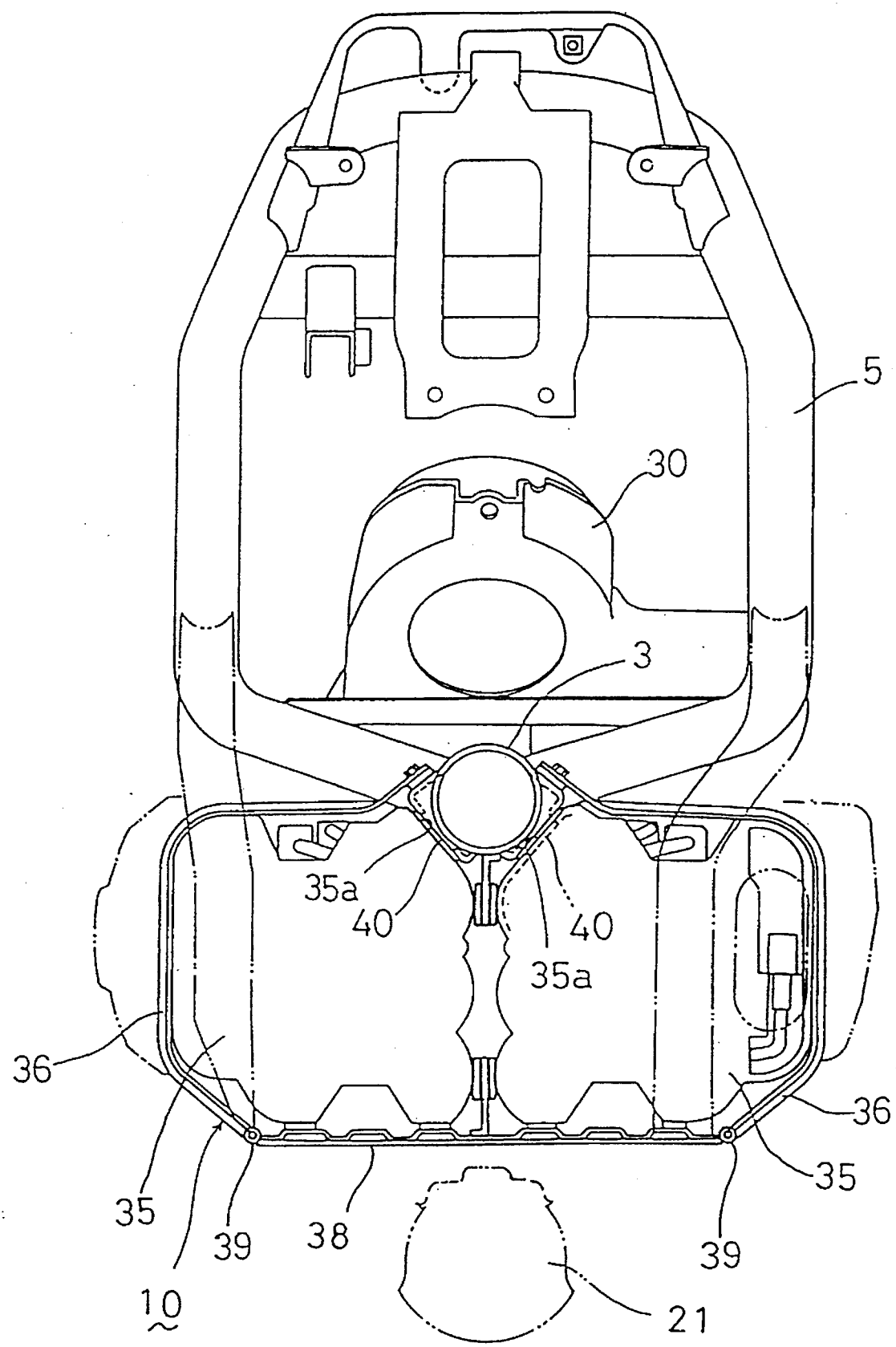
FIG. 3 is a transverse sectional view of the vehicle at a substantially central portion thereof according to the present invention.

FIG. 3 is a transverse sectional view of the vehicle at a substantially central portion thereof according to the present invention. As shown in FIG. 3 viewed from the front of the vehicle, a bottom plate 38 of the battery storing case 10 is located under the main frame 3. The batteries 35 are placed on the bottom plate 38. An air induction hole 35a of each battery 35 is in contact with the main frame 3 through a branch passage 40. The bottom plate 38 is a so-called corrugated plate, which is so formed as to have a large rigidity in a vertical direction. The battery fixing bands 36 are engaged at their lower ends with hinges 39 formed at right and left ends of the bottom plate 38.

Figure 4:
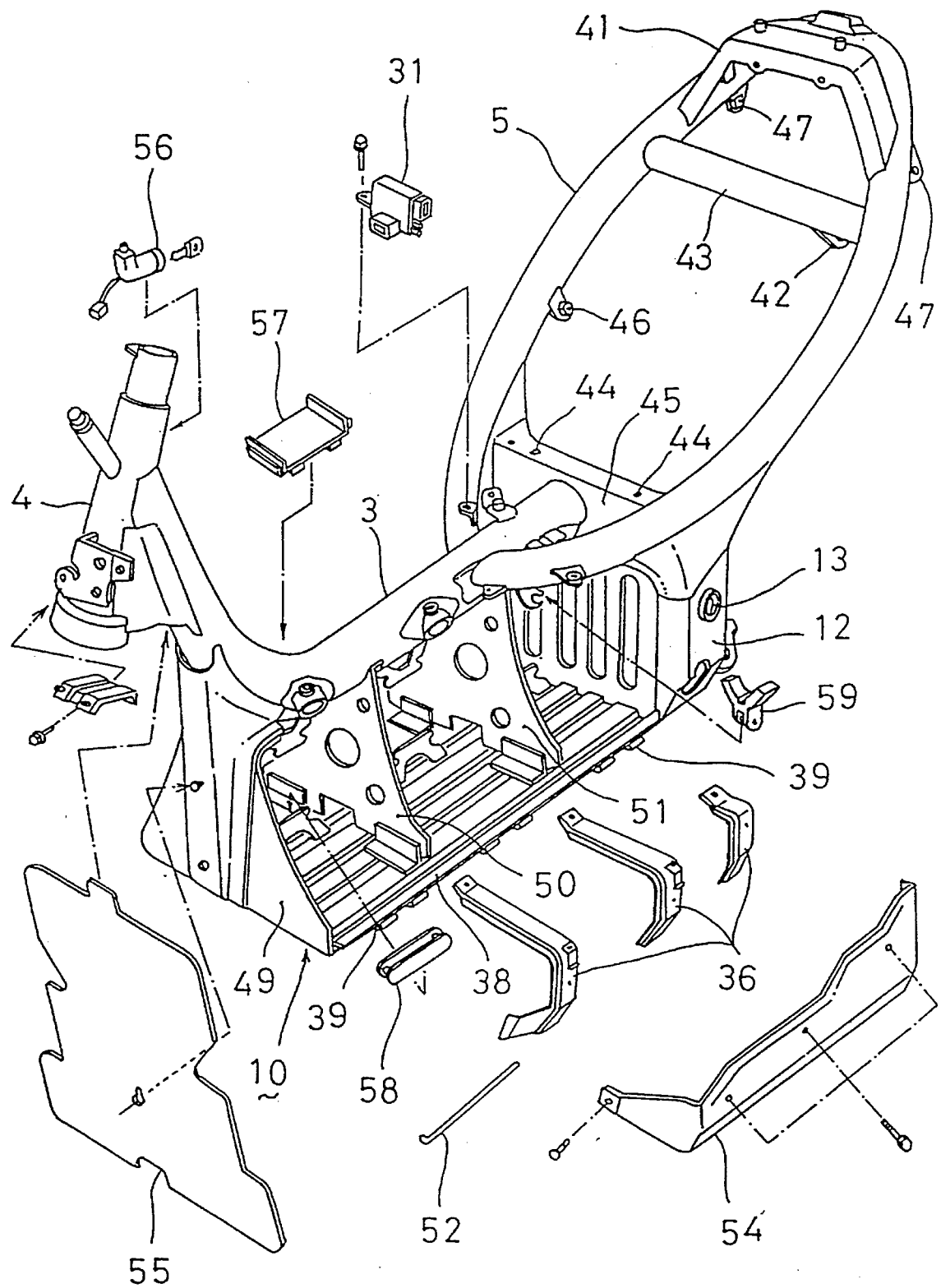
FIG. 4 is an exploded perspective view of the vehicular frame, a battery storing case, and accessories according to the present invention.

FIG. 4 is an exploded perspective view of the vehicular frame, the battery storing case, and accessories. Although not described with reference to FIGS. 2 and 3, a bridge bracket 41, a cross pipe 43 having a mounting tab 42 for the rear suspension 18, and a cross panel 45 having cooling fan mounting holes 44, extending between right and left curved portions of the oval-shaped rear frame 5 in the transverse direction of the vehicle. The cross panel 45 is a member also extending between the right and left brackets 12 for supporting the pivot shaft 13.

Controller mounting tabs 46, 47 are provided on the rear frame.

Substantially triangular support brackets 49, 50, and 51 are suspended from the main frame 3 to support the bottom plate 38. The lower ends of the battery fixing bands 36 are fitted with hinges 39 connected to the bottom plate 38 on each side, and are pivotally supported by an elongated pin 52.

A battery case side lower cover 54 is provided for covering a lower portion of each side of the battery storing case 10. The battery case front cover 55 covers the front end of the battery storing case 10.

A main switch 56 is provided with an ignition key switch. A battery receiving plate 57 and cushion members 58 and 59 prevent transverse slip of each battery 35.

Figure 5:
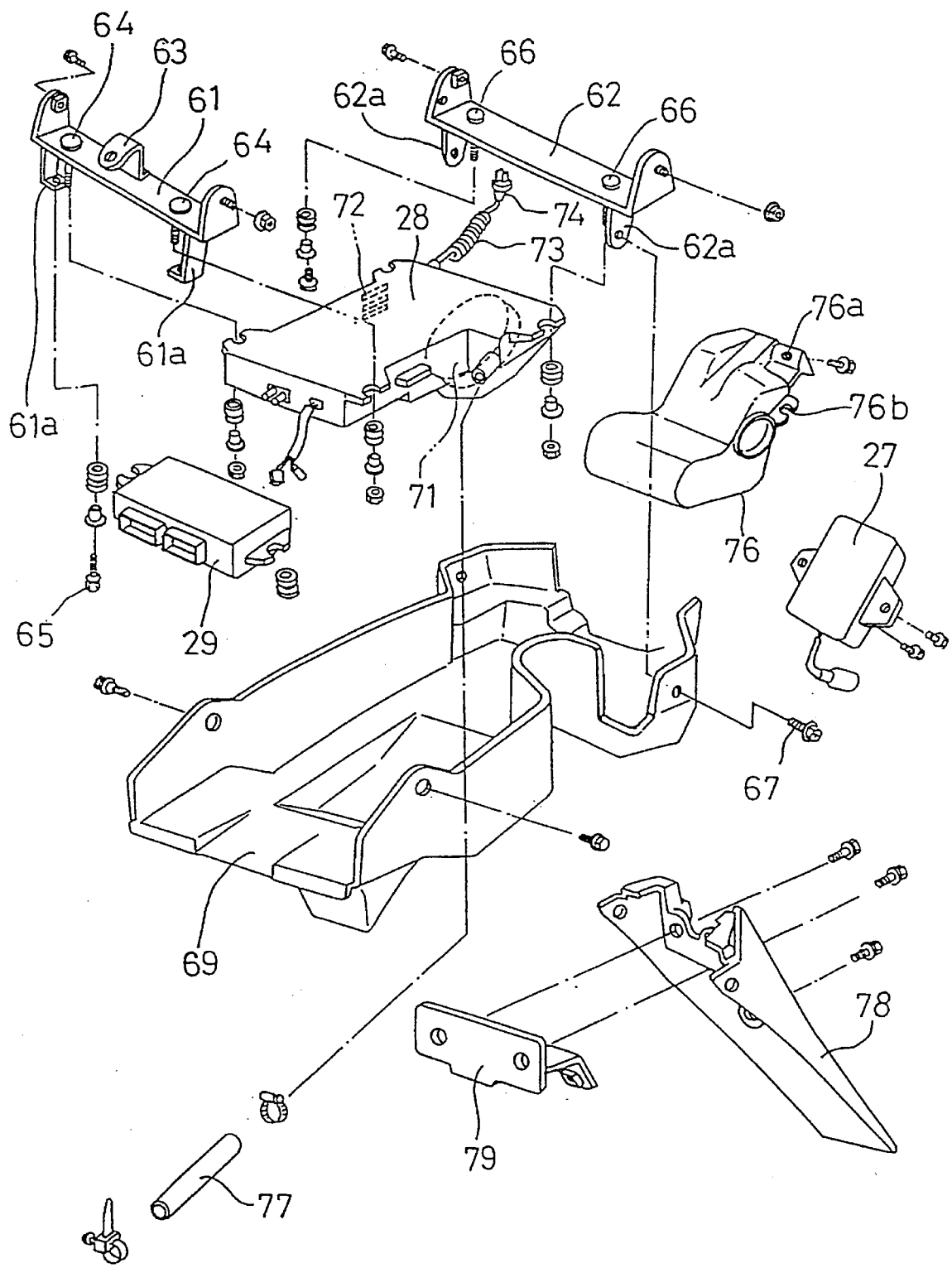
FIG. 5 is an exploded perspective view of controllers, a rear fender, and parts provided near it according to the present invention.

FIG. 5 is an exploded perspective view of the controllers, a rear fender, and parts provided near it. A controller front support 61 is bolted to the controller mounting tabs 46 shown in FIG. 4, and a controller rear support 62 is bolted to the controller mounting tabs 47 shown in FIG. 4.

The controller front support 61 is provided with an upper mounting tab 63 for mounting the battery cooling fan 30, bolts 64 for supporting a front portion of the charge controller 28, and leg portions 61a and bolts 65 for supporting the travel controller 29.

The controller rear support 62 is provided with bolts 66 for supporting a rear portion of the charge controller 28 and leg portions 62a and bolts 67 for supporting a rear portion of a rear fender 69. The rear fender 69 is located over the rear wheel 21 not shown in FIG. 5 to originally serve as a mudguard and also serve as a storing box for the controllers 28 and 29 etc. as shown.

The charge controller 28 must be forcibly cooled because internal elements generate heat during charging. Accordingly, the charge controller 28 is provided with a charger cooling fan 71 and an air induction hole 72.

A charging cord 73 and a charging plug 74 are provided on said controller 28. The charging cord 73 is stored in a charging cord box 76. The charging cord box 76 is formed as a resin blow molding, and it is fixed at mounting tabs 76a and 76b to the vehicular frame 2.

An air discharge hose 77 is provided for permitting heat inside of the charger to escape. A tail fender 78 is mounted on a stay 79.

Figure 6:
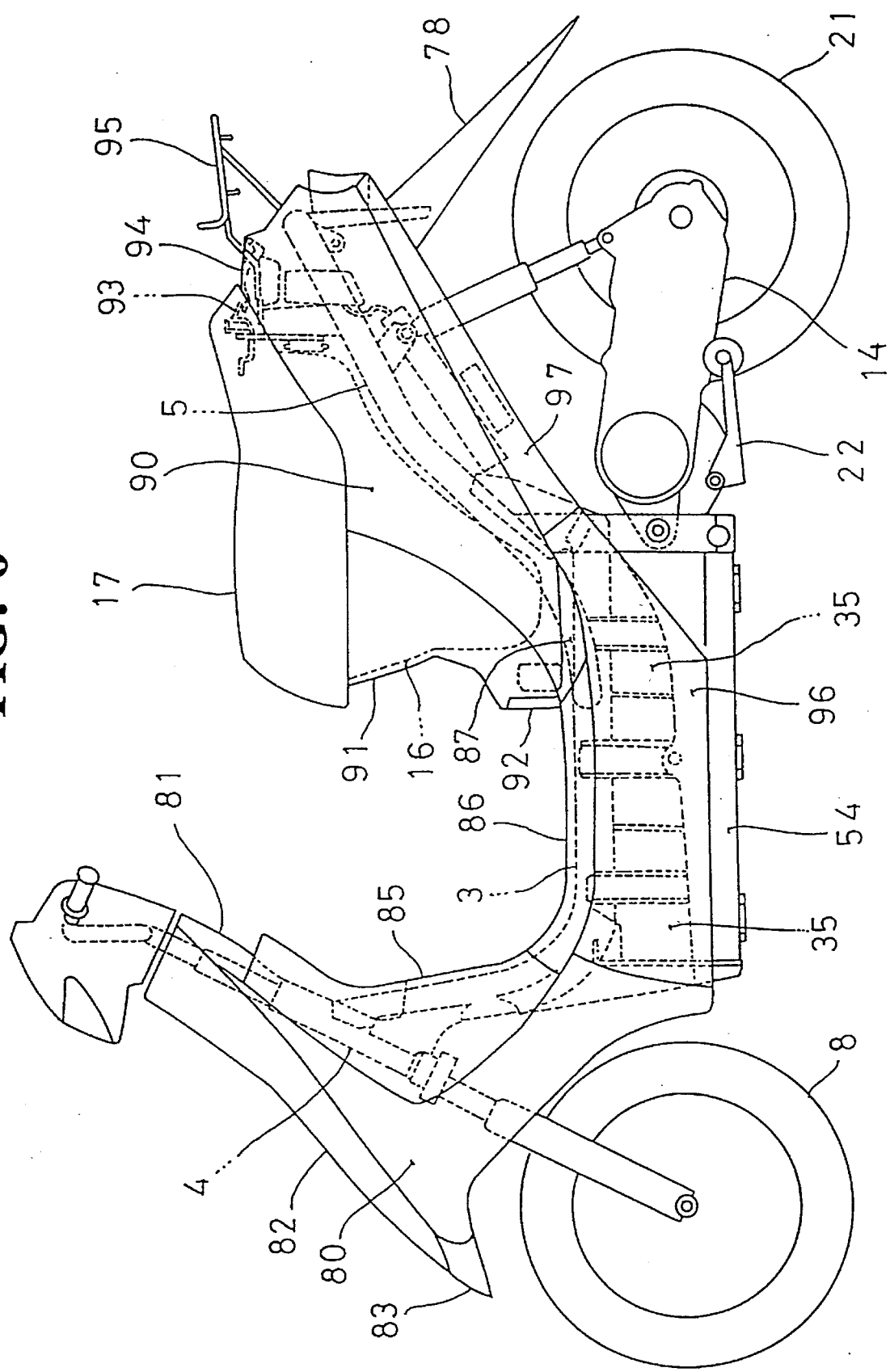
FIG. 6 is a side view of assembled fenders and covers of the electric vehicle according to the present invention.
Figure 7:
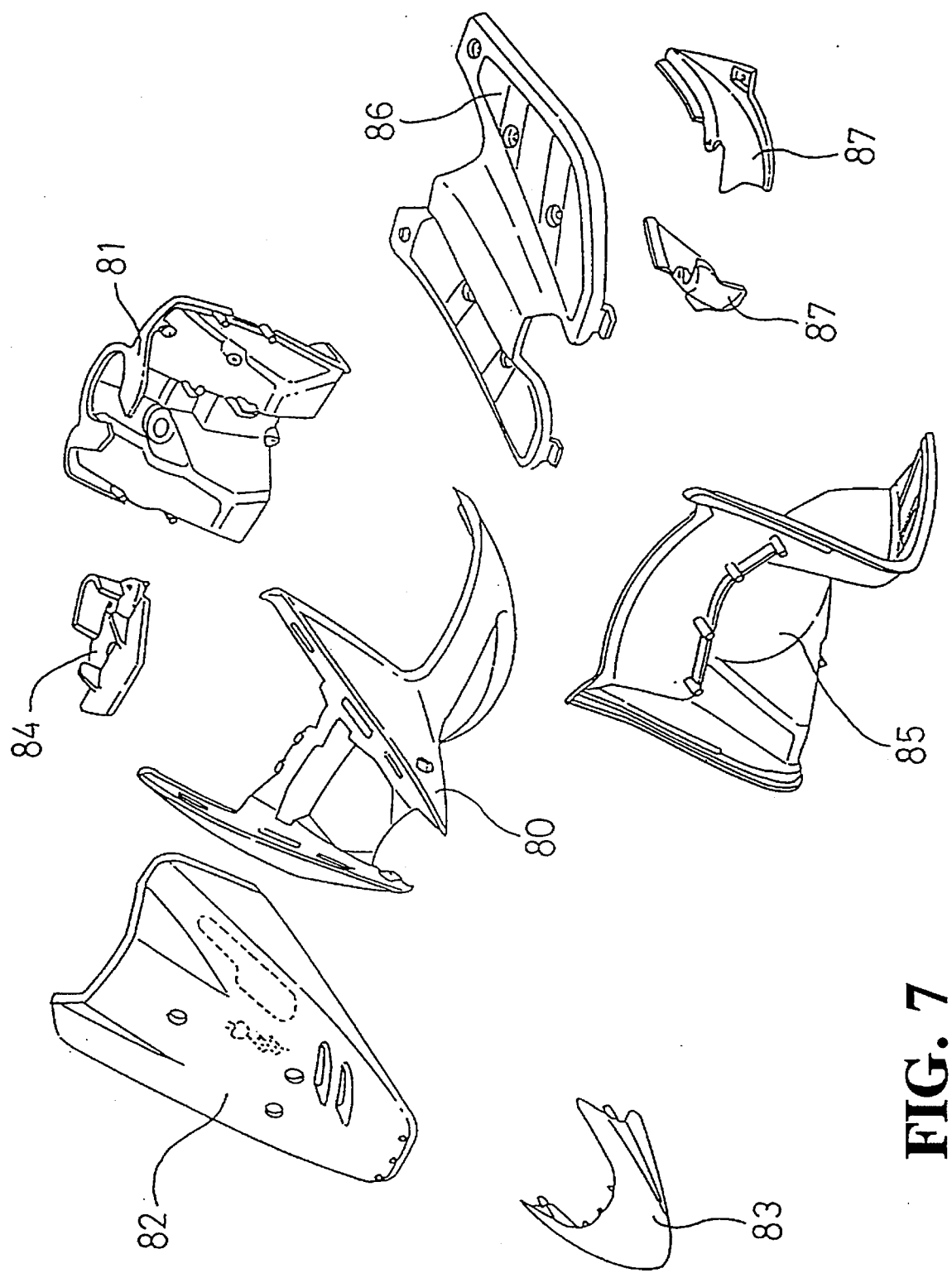
FIG. 7 is an exploded perspective view of the fenders and the covers at a front portion of the vehicle according to the present invention.

FIG. 6 is a side view of assembled fenders and covers of the electric vehicle according to the present invention; FIG. 7 is an exploded perspective view of the fenders and the covers at the front portion of the vehicle; and FIG. 8 is an exploded perspective view of the fenders and the covers at the rear portion of the vehicle.

Referring to FIG. 7, a front fender 80 is provided and has a front inner upper cover 81 which is connected thereto. A front cover 82 is mounted on a front upper portion of the front fender 80. A fender mudguard 83 is mounted on a front lower portion of the front fender 80. A steering mudguard 84 is also provided. A front inner lower cover 85 is provided as shown in FIG. 6. A step floor 86 and right and left side floors 87 are provided above the battery case 10. These parts are so mounted as to cover the main frame 3 and the head pipe 4 as shown in FIG. 6.

Figure 8:
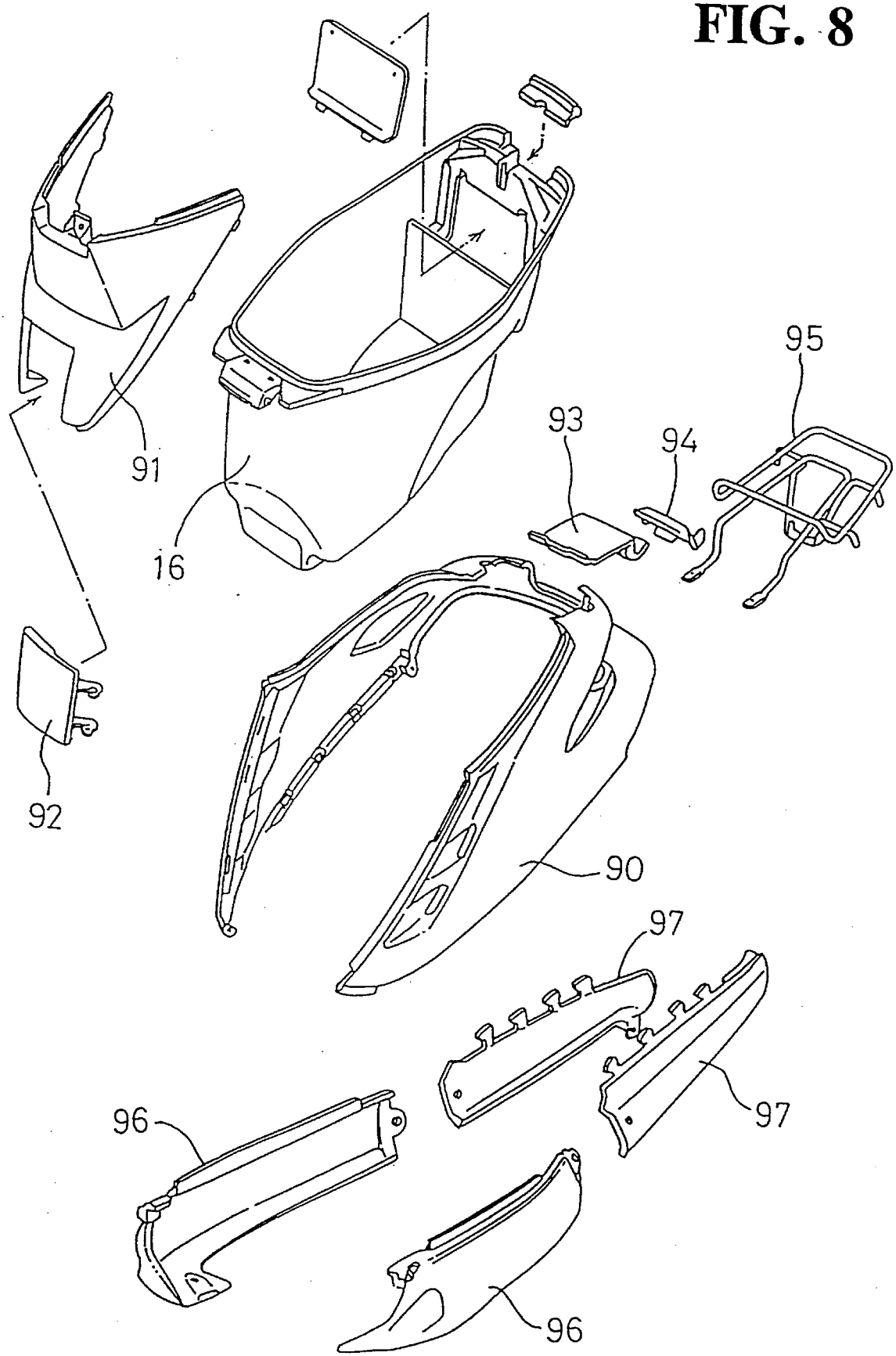
FIG. 8 is an exploded perspective view of the fenders and the covers at a rear portion of the vehicle according to the present invention.

Referring to FIG. 8, a body main cover 90 and a center cover 91 are provided. These parts are so mounted as to cover the helmet storing portion 16. A fuse box lid 92 is provided which is operated for replacement of a fuse at any time. A first and a second lid 93 and 94 are provided for closing a cord outlet opening. A rack 95 is attached to the body main frame. Right and left floor side covers 96 are suspended from the step floor 86 to cover right and left side portions of the battery storing case 10. Right and left side covers 97 extend along right and left lower edges of a rear portion of the body main frame 90. These parts are so mounted as to cover the main frame 3 and the rear frame 5 as shown in FIG. 6.

Parts shown by broken lines in FIG. 6 are the same as those shown in FIG. 1 so the explanation thereof will be omitted herein.

Figure 9:
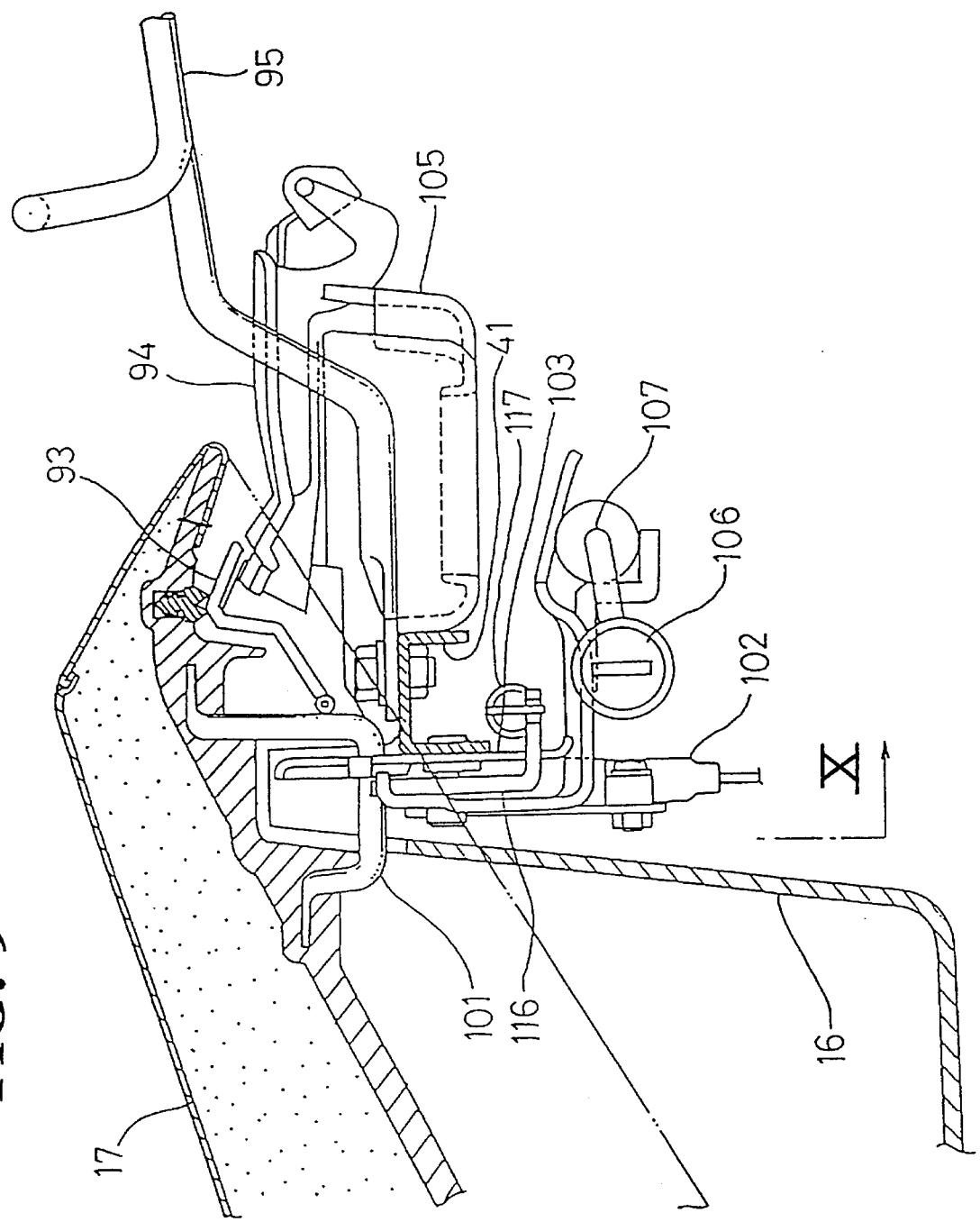
FIG. 9 is an enlarged view of a rear portion of a seat of the vehicle according to the present invention (a view showing a combined seat lock mechanism and plug lid lock mechanism)

FIG. 9 is an enlarged view of a rear portion of the seat of the vehicle according to the present invention (a view showing a combined seat lock mechanism and plug lid lock mechanism). A bent bar (or bent pipe) 101 is mounted to a rear lower portion of the seat 17 closing an upper opening of the helmet storing portion 16.

A seat switch 102 is located under the bent bar 101. The seat switch 102 is bolted through a switch mounting plate 103 to the bridge bracket 41. The switch mounting plate 103 will be hereinafter described in detail.

The charging cord 73 shown in FIG. 1 can be drawn out by first opening the seat 17, secondly opening the first lid 93, and finally opening the second lid 94. A plug stop 105 is provided for retaining a plug provided at one end of the charging cord 73.

A key cylinder 106 has a lever 107 linked thereto. When the key cylinder 106 is turned, the lever 107 is raised to permit the seat 17 to be opened. This mechanism will be next described in detail.

Figure 10:
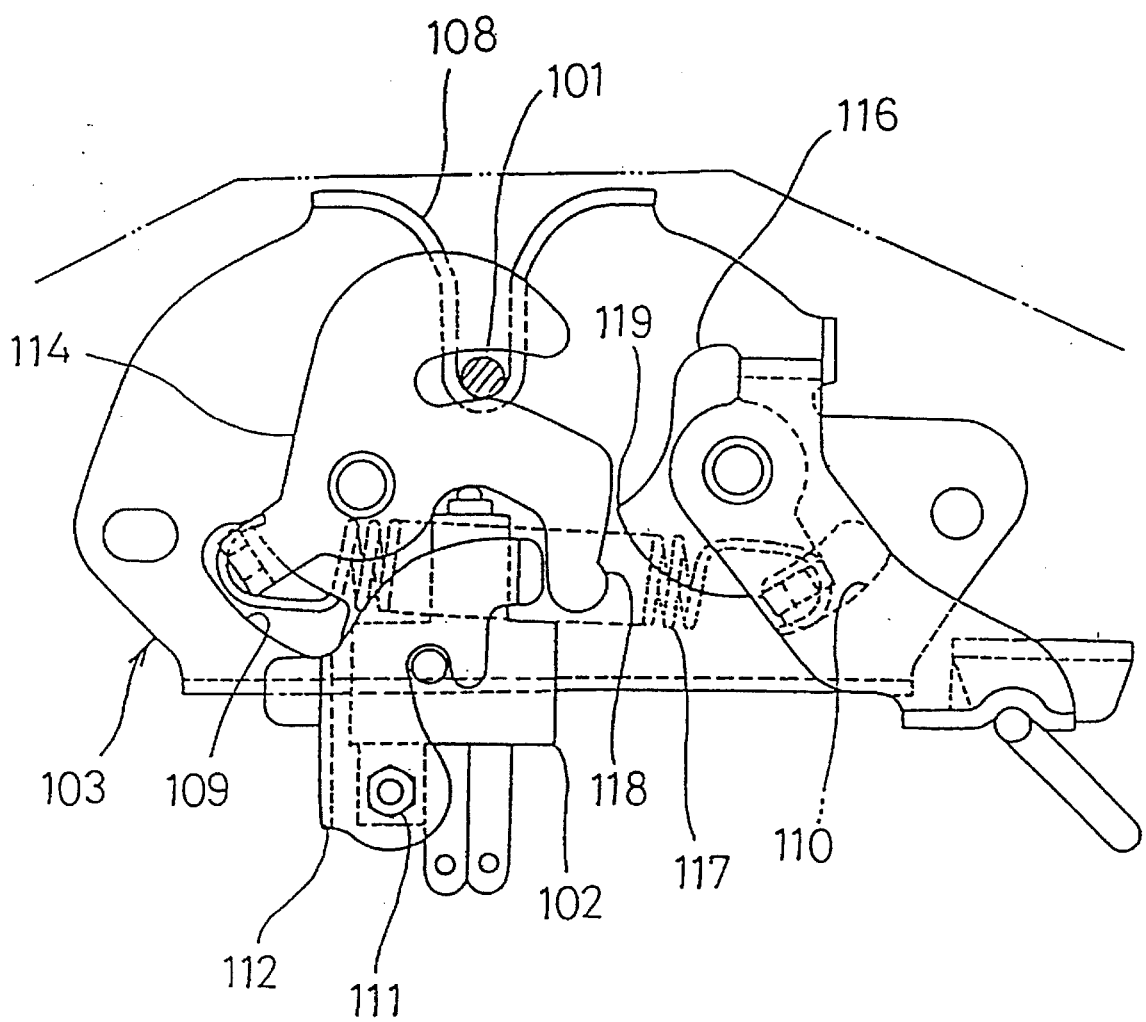
FIG. 10 is a view taken in a direction shown by an arrow X in FIG. 9.

FIG. 10 is a view taken in a direction shown by an arrow 10 in FIG. 9. The switch mounting plate 103 is a plate member having a guide groove 108 for guiding the bent bar 101 at an upper portion and also having two arcuate holes 109 and 110 at right and left lower portions.

The seat switch 102 is secured to a small bracket 112 by a bolt 111. The small bracket 112 is welded to a front surface of the switch mounting plate 103. Thus, the seat switch 102 is mounted to the switch mounting plate 103 at a central lower portion thereof.

A first swing plate 114 for depressing the seat switch 102 by a lowering motion of the bent bar 101 is pivotably mounted to the switch mounting plate 103.

Further, a second swing plate 116 is pivotably mounted to the switch mounting plate 103.

The first switch plate 114 is normally biased in a counterclockwise direction by a spring 117, and the second swing plate 116 is normally biased in a clockwise direction by the spring 117.

When a passenger leaves the seat 17, the first swing plate 114 is slightly rotated in the counterclockwise direction from the position shown in FIG. 10 by the operation of the spring 117, so that an arm 118 of the first swing plate 114 comes into abutment against a cam 119 of the second swing plate 116 to stop in this position.

Since the second swing plate 116 is in rest, no further rotation of the first swing plate 114 in the counterclockwise direction is inhibited, so that further rising of the bent bar 101 is restricted by the first swing plate 114. Accordingly, the seat 17 is in a closed position.

In other words, when a passenger sits on the seat 17, the first swing plate 114 is rotated in the clockwise direction by the bent bar 101 to depress the seat switch 102 and close it as shown in FIG. 10. Conversely, when the passenger leaves the seat 17, the first swing plate 114 is slightly rotated in the counterclockwise direction from the condition shown in FIG. 10 by the operation of the spring 117 to thereby open the seat switch 102. Thus, the presence or the absence of the passenger on the seat 17 can be electrically detected with the seat 17 kept locked.

The seat 17 is opened in the following procedure.

First, the key cylinder 106 shown in FIG. 9 is turned to raise the lever 107. As a result, the second swing plate 116 shown in FIG. 10 is rotated in the counterclockwise direction, and the cam 119 of the second swing plate 116 becomes lower in level than the arm 118 of the first swing plate 114. As a result, the locking operation of the cam 119 is lost, and the first swing plate 114 is largely rotated in the counterclockwise direction by the operation of the spring 117 to permit free rise of the bent bar 101. Thereafter, the seat 17 is opened by hand.

Figure 11:
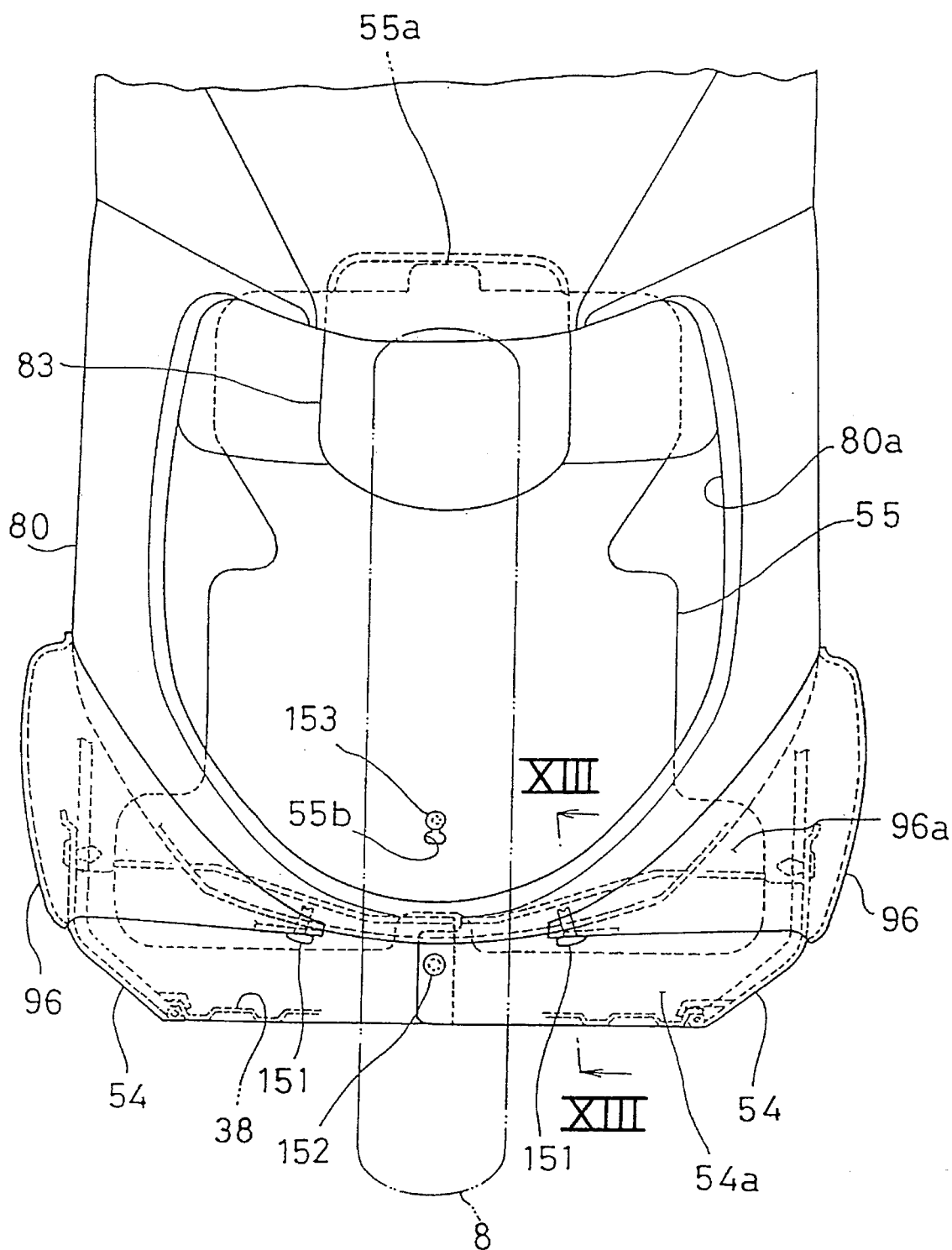
FIG. 11 is a front view of a cover structure according to the present invention as viewed from the front side of the vehicle.

FIG. 11 is a front view of a cover structure according to the present invention as viewed from the front side of the vehicle. The floor side covers 96 are mounted to right and left lower portions of the front fender 80, and the battery case side lower covers 54 are mounted inside and under the floor side covers 96. While the floor side covers 96 and the battery case side lower covers 54 are so mounted as to cover right and left sides of the battery storing case 10, front portions (which will be hereinafter referred to as "first subcovers") 96a of the floor side covers 96 are bent toward the transverse center of the vehicle and are secured to the front fender 80 by clips 151, and similarly front portions (which will be hereinafter referred to as "second subcovers") 54a of the battery case side lower covers 54 are bent to the transverse center of the vehicle and are secured to the battery case front cover 55 by a common clip 152.

It is featured that the first subcovers 96a, the second subcovers 54a, and the battery case front cover 55 are mounted in this order from the front to the rear of the vehicle, and especially that the battery case front cover 55 is formed as a large, substantially rectangular plate to substantially close a large opening 80a of the front fender 80.

Figure 12:
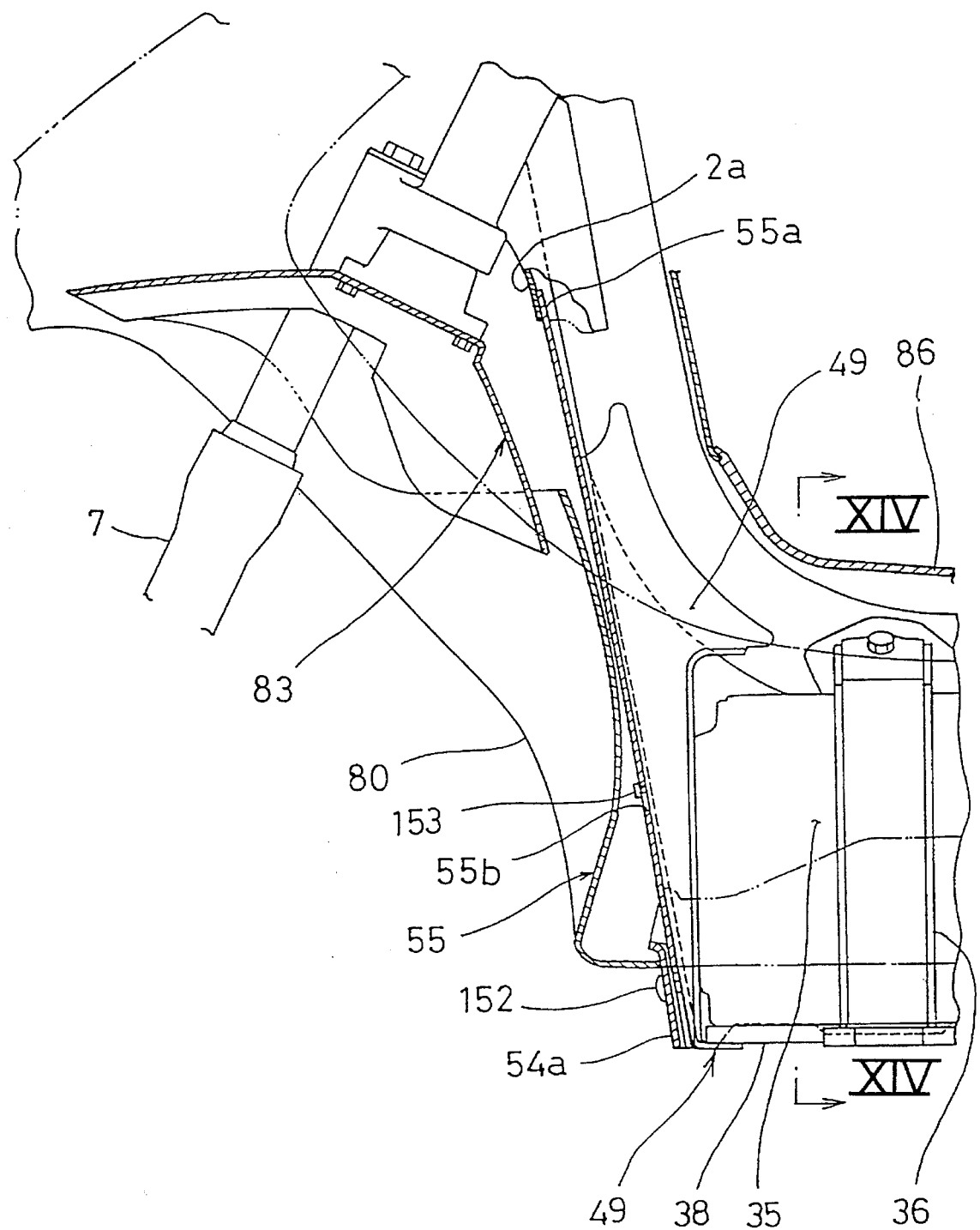
FIG. 12 is a sectional side view of the cover structure shown in FIG. 11.

FIG. 12 is a sectional side view of the cover structure shown in FIG. 11. The battery case front cover 55 behind the front fender 80 is mounted to the vehicular frame 2 by inserting a tongue portion 55a formed at an upper end of the cover 55 into a receiving portion 2a of the vehicular frame 2 and bringing a key hole 55b formed at a transverse central, lower portion of the cover 55 into engagement with a pin head 153 provided on the front surface of the support bracket 49.

Figure 13:
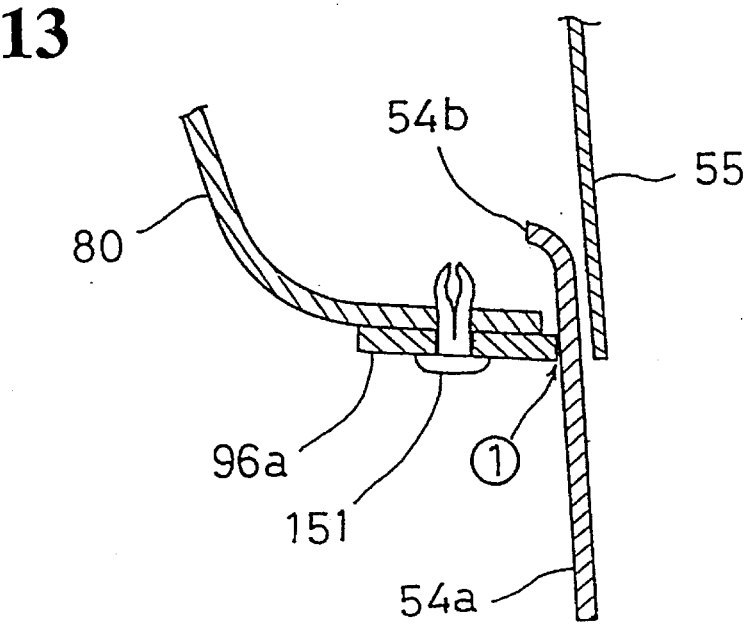
FIG. 13 is a cross section taken along the line XIII—XIII in FIG. 11.

FIG. 13 is a cross section taken along the line XIII—XIII in FIG. 11. There is shown in FIG. 13 a mounting structure such that each second subcover 54a is disposed just before the lower end of the battery case front cover 55, each first subcover 96a is disposed closely before the second subcover 54a, and the first subcover 96a is closely mounted on the front fender 80 by the corresponding clip 151.

Figure 14:
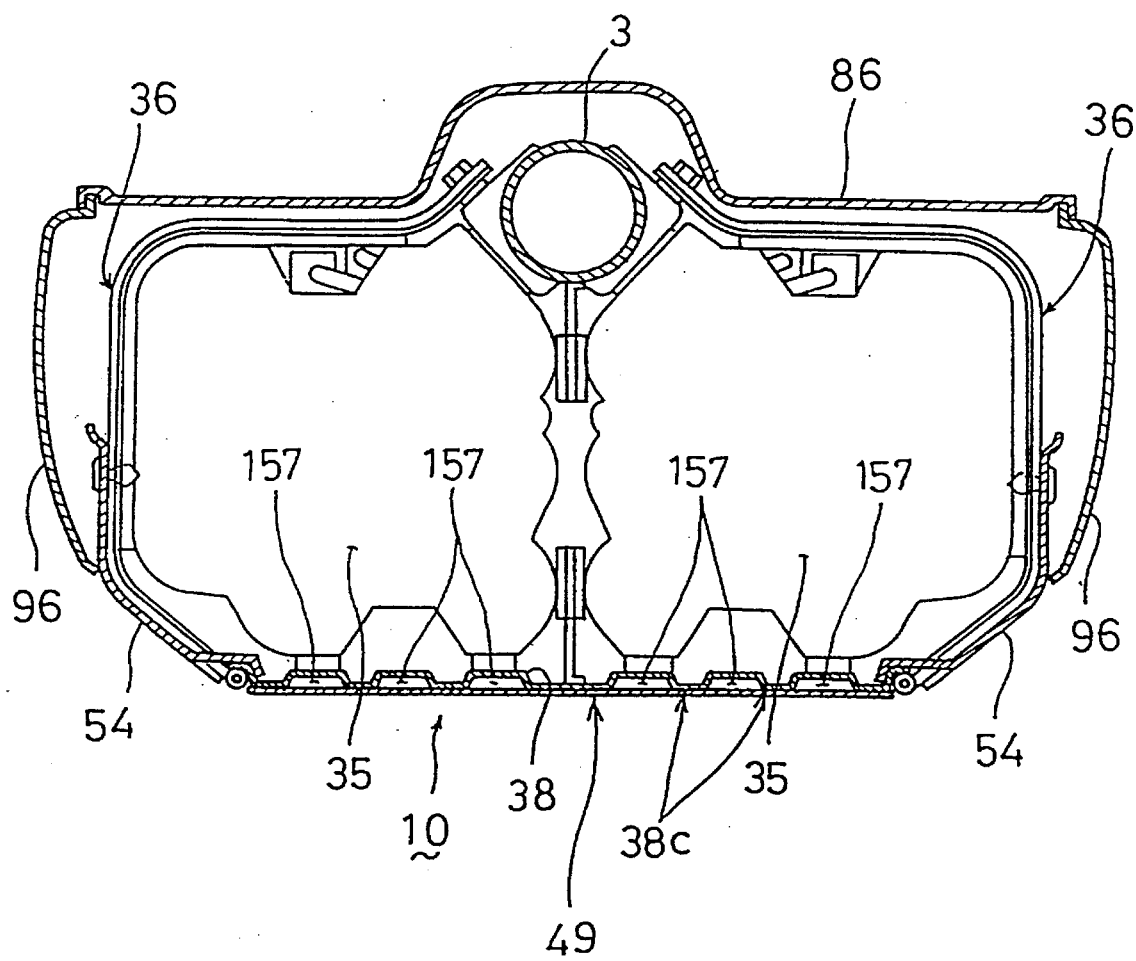
FIG. 14 is a cross section taken along the line XIV—XIV in FIG. 12.

FIG. 14 is a cross section taken along the line XIV—XIV in FIG. 12, illustrating a covered condition of the battery storing case 10.

That is, the batteries 35 arranged in the right and left rows below the main frame 3 and placed on the bottom plate 38 are covered with the step floor 86 on the upper side, with the floor side covers 96 on the right and left upper sides, and with the battery case side lower covers 54 on the right and left lower sides.

Figure 15:
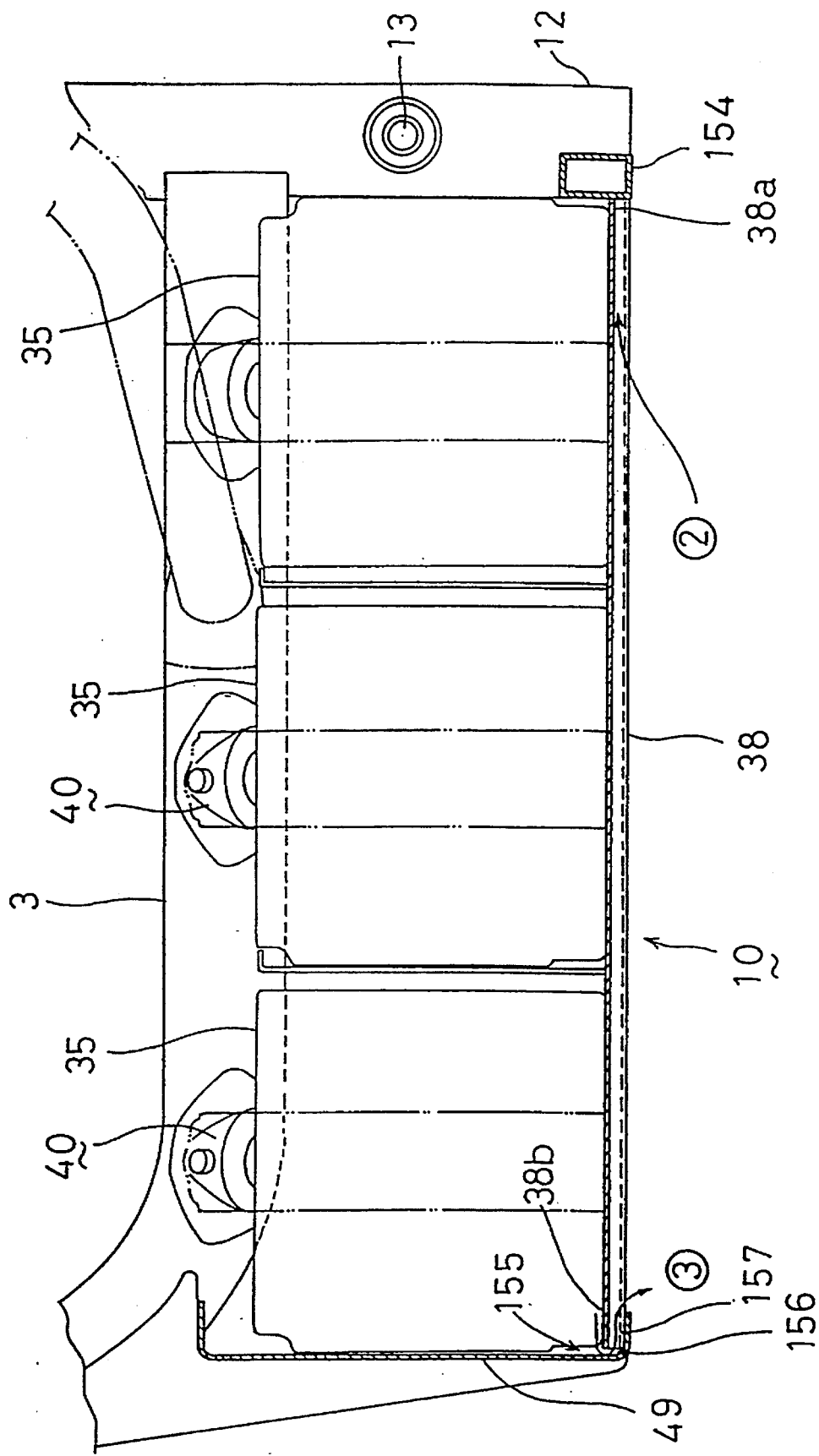
FIG. 15 is a longitudinal sectional view of a bottom plate of a battery storing case according to the present invention.

FIG. 15 is a longitudinal sectional view of the bottom plate 38 of the battery storing case 10 according to the present invention. The bottom plate 38 is formed as a saw-toothed corrugated plate in order to improve a flexural rigidity. A rear end 38a of the bottom plate 38 is in close contact with a square bar 154 extending between the right and left brackets 12 which support the pivot shaft 13. On the other hand, a front end 38b of the bottom plate 38 is welded to the support bracket 49 only at trough portions 38c of the bottom plate 38 with a given space 155 defined between the front end 38b and the support bracket 49.

This space 155 is composed of first passages 156 having upper ends exposed into the battery storing case 10 and second passages 157 having front ends connected with lower ends of the first passages 156 and rear ends exposed to the outside of the battery storing case 10.

The operation of the cover structure shown in FIGS. 11 to 15 will now be described.

Referring to FIG. 11, when the front wheel 8 is rotated at high speeds to splash muddy water on the road, it is anticipated that the muddy water strongly strikes against an area near the clips 152 and 151 behind the front wheel 8. In particular when the front wheel 8 rushes into a water pool, the water pool is cut in a V-shape by the front wheel 8. Accordingly, the muddy water more strongly strikes against the area near the clips 151.

The second subcovers 54a are overlapped and secured together by the clip 152 at the transverse center of the vehicle, so that a high waterproof performance at this portion can be ensured.

Further, as shown in FIG. 13, it is featured that each first subcover 96a is overlapped with the lower end of the front fender 80 near the corresponding clip 151. It is also shown that the rear end of the first subcover 96a is in close contact with the corresponding second subcover 54a. Finally, an upper end 54b of each second subcover 54a is bent to the front side of the vehicle.

Accordingly, a splash of muddy water from the road (as shown by an arrow 1) is basically stopped by each first subcover 96a. Further, the remainder of the muddy water forced upward between the first subcover 96a and the corresponding second subcover 54a is stopped by the upper end 54b of each second subcover 54a. Thus, the entry of the muddy water can be effectively prevented by such a maze structure.

Referring next to FIG. 15, the splash of the muddy water also strikes against the lower surface of the bottom plate 38 as shown by an arrow 2. However, since the rear end 38a of the bottom plate 38 is in close contact with the square bar 154, the muddy water is prevented from entering the battery storing case 10 from this portion.

Further, a small amount of water gathered inside the battery storing case 10 because of dewing of the inside air, for example, is discharged through the first passages 156 at the front end 38b of the bottom plate 38 and the second passages 157 defined by the crests and the troughs of the bottom plate 38 as shown by an arrow 3. Since the first passages 156 and the second passages 157 form maze passages and the splash of the muddy water from the road comes in the direction shown by the arrow 2, there is no possibility that the muddy water may reversely flow in the maze passages to enter the battery storing case 10.

Although the cover structure is applied to the front wheel 8 and the front fender 80 in the above preferred embodiment, it may be applied to the rear wheel 21 and the rear fender 69.

As described above, according to the present invention, in a cover structure for an electric vehicle having a battery storing case provided behind a wheel, a subcover is provided between a fender covering the wheel and a front surface of the battery storing case, and a gap generating between the subcover and the fender or the front surface of the battery storing case is formed like a maze so as to stop an upward flow of muddy water. Accordingly, the entry of the muddy water into the battery storing case can be effectively prevented.

Further, in a battery storing case for an electric vehicle wherein right and left ends of a bottom plate on which a battery is placed are in close contact with battery case side covers, a rear end of the bottom plate is in close contact with a vehicular frame, and a front end of the bottom plate is separate from the vehicular frame to define a space therebetween; the space comprises a first passage having one end exposed into the battery storing case and a second passage having one end connected to another end of the first passage and another end directed rearward of the vehicle and opening to an outside of the battery storing case. Accordingly, the muddy water flowing along the lower surface of the bottom plate is prevented from entering the battery storing case. Moreover, water present in the battery storing case can be discharged through the first passage and the second passage. Since the second passage opens to the rear side of the vehicle, there is no possibility that the muddy water may reversely flow in the first and second passages to enter the battery storing case.

In a form of the present invention, the bottom plate comprises a corrugated plate, and the second passage is formed between a crest and a trough of the corrugated plate. Accordingly, the second passage can be easily formed, so that a working cost for forming the second passage can be saved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric vehicle including a cover structure, said cover structure comprising:

a battery storing case provided behind a wheel;

a fender partially covering a rear portion of said wheel;

a subcover provided between said fender and a front surface of said battery storing case, wherein a gap between said subcover and said fender forms a tortuous path so as to stop an upward flow of muddy water through said gap, and wherein said subcover includes a pair of first subcovers which are attached to said front fender, and a pair of second subcovers which are attached to said front surface of said battery storing case.

2. The electric vehicle according to claim 1, wherein said first subcovers are integrally formed as a unitary piece with floor side covers of said electric vehicle.

3. The electric vehicle according to claim 2, wherein said first subcovers are disposed at front portions of said floor side covers and are bent toward a transverse center of the vehicle.

4. The electric vehicle according to claim 1, wherein said second subcovers are integrally formed as a unitary piece with battery case side covers.

5. The electric vehicle according to claim 4, wherein said second subcovers are disposed at front portions of said battery case side covers and are bent toward a transverse center of the vehicle.

6. The electric vehicle according to claim 1, wherein said second subcovers each have an upper end which is bent forward relative to a traveling direction of said electric vehicle.

7. An electric vehicle including a battery storing case, said battery storing case comprising:

a bottom plate on which a battery is placed;

a pair of battery case side covers in close contact with right and left ends of said bottom plate, wherein a rear end of said bottom plate is in close contact with a vehicular frame, and a front end of said bottom plate is separate from said vehicular frame to define a space therebetween, said space comprising a first passage having one end exposed into said battery storing case and a second passage having one end connected to another end of said first passage and another end opening to an outside of said battery storing case and directed rearward of said vehicle.

8. The electric vehicle according to claim 7, wherein said bottom plate comprises a corrugated plate having crests and troughs, and said second passage is formed between the crests and the troughs of said corrugated plate.

* * * * *